(12) United States Patent
Tuli et al.

(10) Patent No.: US 8,463,232 B2
(45) Date of Patent: Jun. 11, 2013

(54) ACCURATE BILLING FOR SERVICES USED ACROSS MULTIPLE SERVING NODES

(75) Inventors: Amol Tuli, Elgin, IL (US); Venkat Gopikanth, Long Grove, IL (US); Tushar Raval, Vernon Hills, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1034 days.

(21) Appl. No.: 11/967,378

(22) Filed: Dec. 31, 2007

(65) Prior Publication Data

US 2009/0170469 A1 Jul. 2, 2009

(51) Int. Cl.
*H04M 11/00* (2006.01)

(52) U.S. Cl.
USPC .......... 455/405; 455/436; 455/432.1

(58) Field of Classification Search
USPC ........... 455/405–409, 432.1–433, 436–444
See application file for complete search history.

(56) References Cited

U.S. PATENT DOCUMENTS

| | | | |
|---|---|---|---|
| 6,574,610 B1 * | 6/2003 | Clayton et al. | 705/51 |
| 2003/0051041 A1 | 3/2003 | Kalavade et al. | |
| 2004/0005878 A1 | 1/2004 | Olin et al. | |
| 2004/0018829 A1 * | 1/2004 | Raman et al. | 455/406 |
| 2004/0125770 A1 | 7/2004 | Pitt et al. | |
| 2005/0181757 A1 | 8/2005 | Koskinen et al. | |
| 2006/0004643 A1 | 1/2006 | Stadelmann et al. | |
| 2006/0050687 A1 | 3/2006 | Ganesan | |
| 2006/0058008 A1 | 3/2006 | Choksi | |

FOREIGN PATENT DOCUMENTS

| | | |
|---|---|---|
| EP | 2139258 A1 | 12/2009 |
| KR | 1020070103826 A | 10/2007 |
| WO | 2007081132 A1 | 7/2007 |

OTHER PUBLICATIONS

Patents Act 1977: Examination Report Under Section 18(3), Feb. 5, 2012, all pages.

* cited by examiner

*Primary Examiner* — Vladimir Magloire

(57) ABSTRACT

A method, wireless service node, and wireless communication system, are provided to manage wireless service usage and service node migration in the wireless communication system. A registration request from a wireless device (108) is received. A charging session associated with the wireless device (108) is established with a billing server (124). Wireless service usage is associated with the wireless device (108). The wireless device (108) is determined to be migrating to a new wireless service node (114). Information associated with the current charging session is transferred to the new wireless service node (114). Following the transfer, the service usage information pertaining to the same session is maintained and transferred by the new wireless service node to the billing server at appropriate time intervals and as per dynamic rules set in the billing server.

12 Claims, 13 Drawing Sheets

United States Patent US 8,463,232 B2

ACCURATE BILLING FOR SERVICES USED ACROSS MULTIPLE SERVING NODES

FIELD OF THE INVENTION

The present invention generally relates to the field of wireless communications, and more particularly relates to accurately billing services used by a wireless device across multiple serving nodes.

BACKGROUND OF THE INVENTION

Wireless communication services such as voice and data services can be provided to subscribers via access points. For example, 802.16 capable devices can register with one or more access points and perform voice or data services. However, many access points service a small coverage area, thereby resulting in a wireless device frequently "hopping" across different access points as the device moves. Few systems today track usage data across access points. One problem with current systems utilizing access points is that each access point is responsible for determining user data usage under its own coverage. In other words, each access point that a user registers with may transmit it own usage data information to a billing system. Therefore, the billing system receives multiple billing reports for a particular device. This can create excessive overhead at the billing system.

Another problem with current systems implementing access points is that a wireless device can move out of a current coverage area prior to the access point sending its billing report to the billing system. In this situation, the usage under this access point does not get added to the overall billing record of the wireless device at the billing system. In order to maintain integrity in the overall billing record of wireless devices, current systems require that a new charging session be initiated each time a wireless device registers with a new access point. This results in unnecessary messaging overhead between the access point and the billing system. Also, the billing system can experience capacity issues thereby requiring a more powerful billing system or multiple instances of the billing system, which can create complexities in implementing the multiple instances.

Therefore a need exists to overcome the problems with the prior art as discussed above.

SUMMARY OF THE INVENTION

Briefly, in accordance with the present invention, disclosed is a method with a wireless service node for managing wireless service usage and service node migration. The method includes receiving a registration request from a wireless device. A charging session associated with the wireless device is established with a billing server. Wireless service usage associated with the wireless device is monitored. The wireless device is determined to be migrating to a new wireless service node. Information associated with the current charging session is transferred to the new wireless service node, wherein the new wireless service node continues to monitor wireless service usage by the wireless device under the established charging session.

In other embodiments, a wireless service node for managing wireless service usage and service node migration is disclosed. The wireless service node includes a memory and a processor that is communicatively coupled to the memory. A transceiver is also communicatively coupled to the memory and processor. A device manager is communicatively coupled to the memory, processor, and the transceiver. The device manager is adapted to receive a request from a wireless device, establish a charging session associated with the wireless device, monitor wireless service usage associated with the wireless device, determine that the wireless device is migrating to a new wireless service node, and transfer information associated with the current charging session to the new wireless service node. The new wireless service node continues to monitor wireless service usage by the wireless device under the charging session which has been established.

In yet another embodiment, a method, with a billing server, for managing wireless service usage and service node migration is disclosed. The method includes monitoring activity associated with at least a first wireless service node and a second wireless service node. A current service usage load associated with each of the first wireless service node and the second wireless service node is determined. At least one service usage management configuration parameter is generated for each of the first wireless service node and the second wireless service node. The at least one service usage management configuration parameter comprises information for at least one of managing wireless device service usage and managing wireless service node migration based on the current service usage load associated with the first wireless service node and the second wireless service node, respectively.

An advantage of the various embodiments of the present invention, as discussed above, is that a single charging session can be used for a wireless device that migrates across multiple wireless service nodes. This prevents unnecessary overhead from occurring at the billing server. The various embodiments also maintain the integrity of accounting information by consolidating all relevant information pertaining to a session. The wireless service nodes dynamically manage the accounting information such as service associated with a wireless device. For example, a wireless service node (such as a source access point) can dynamically choose to transfer service usage data to a billing server or report the service usage data to a wireless service node (such as a target access point) associated with a wireless device migration. A target access point can dynamically choose to immediately report service usage data or to defer reporting the service usage data received from a source access point. Another advantage is that rules for exchanging service usage information can be changed at the billing server on a per session, per day, or periodic basis, depending on the conditions in the network. These dynamic rules govern the behavior of wireless service nodes on how to treat service usage data.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The term "billing" is used interchangeably with charging and accounting and includes terms as such. In general, embodiments of the present invention discussed herein are applicable to any wireless system that tracks usage data for the purposes of generating accounting, billing or charging records. In various embodiments, this has been characterized as a charging collection function and a charging data function or charging gateway.

The term "wireless device" is intended to broadly cover many different types of devices that can wirelessly receive signals, and optionally can wirelessly transmit signals, and may also operate in a wireless communication system. For example, and not for any limitation, a wireless communication device can include any one or a combination of the following: a two-way radio, a cellular telephone, a mobile phone, a smartphone, a two-way pager, a wireless messaging device, a laptop/computer, automotive gateway, residential gateway, and other similar devices.

Wireless Communication System

Figure 1:
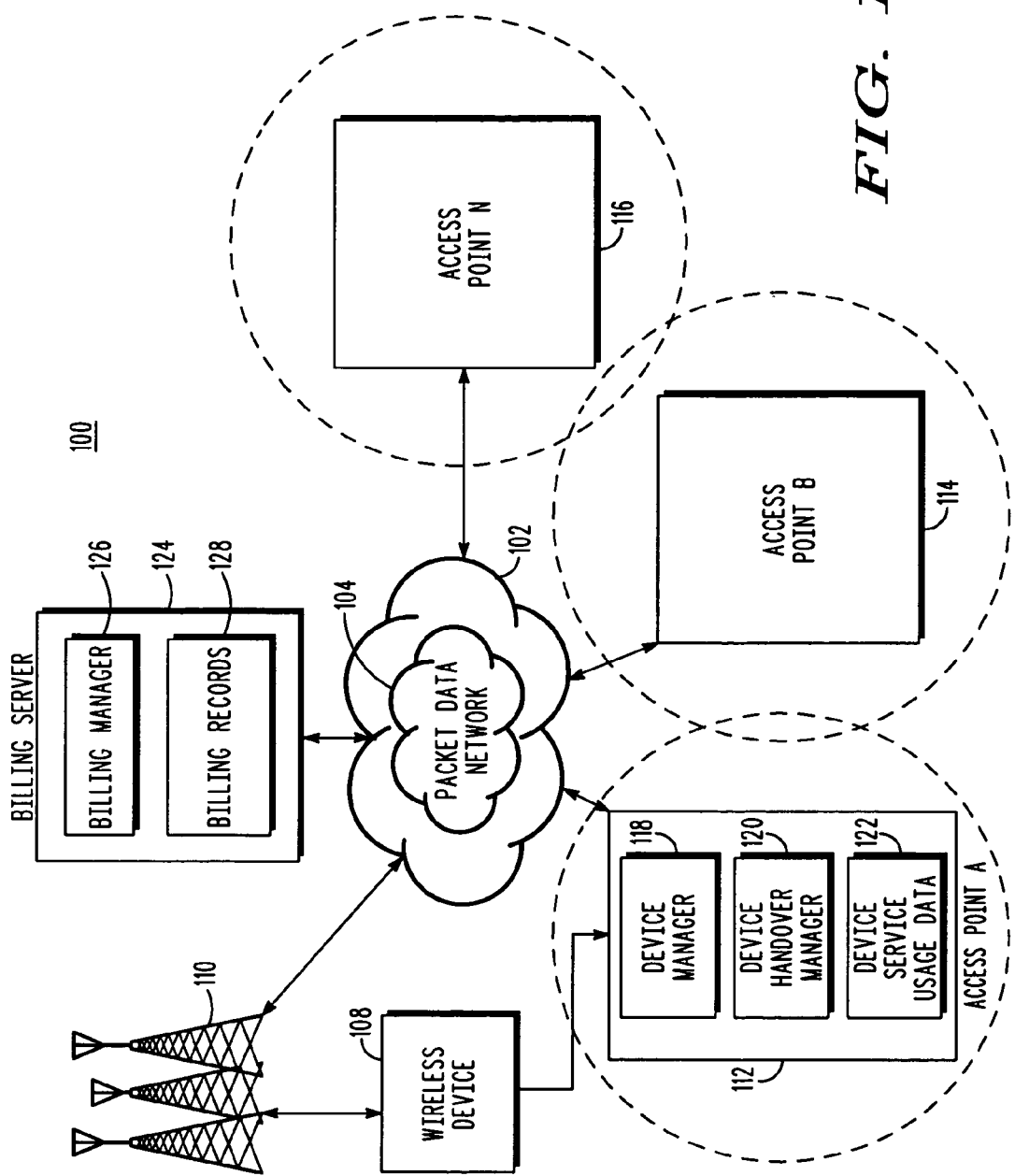
FIG. 1 is block diagram illustrating a wireless communication system, according to one embodiment of the present invention.

According to one embodiment of the present invention as shown in FIG. 1 a wireless communication system 100 is illustrated. Wireless communication system 100 comprises a wireless communication network 102 having one or more access networks, such as a packet data network 104. In one embodiment, the packet data network 104 is an IP or SIP based connectivity network, which provides data connections at much higher transfer rates than a traditional circuit services network. The packet data network 104 can comprise an Evolution Data Only ("EV-DO") network, a General Packet Radio Service ("GPRS") network, a Universal Mobile Telecommunications System ("UMTS") network, an 802.11 network, an 802.16 (WiMAX) network or equivalent wireless broadband technologies like Long Term Evolution (LTE), Ethernet connectivity, dial-up modem connectivity, or the like. It should be noted that the one or more access networks, such as packet data network 104, may also include additional components (not shown) such as controllers, transport/interconnect gear, network management modules, and other components that are known to those of ordinary skill in the art.

The communications standard of the wireless communication network 102 can comprise Code Division Multiple Access ("CDMA"), Time Division Multiple Access ("TDMA"), Global System for Mobile Communications ("GSM"), General Packet Radio Service ("GPRS"), Frequency Division Multiple Access ("FDMA"), other IEEE 802.16 standards, Orthogonal Frequency Division Multiplexing ("OFDM"), Orthogonal Frequency Division Multiple Access ("OFDMA"), Wireless LAN ("WLAN"), WiMAX or the like. Other applicable communications standards include those used for Public Safety Communication Networks including Project 25 ("P25") or TErrestrial TRunked rAdio ("TETRA").

The wireless communication system 100 supports any number of wireless devices 108 (one shown) which can be single mode or multi-mode devices. Multi-mode devices are capable of communicating over multiple access networks with varying technologies. For example, a multi-mode device can communicate over the one or more access networks, such as packet data network 104, using various services such as Push-To-Talk ("PTT"), Push-To-Talk Over Cellular ("PoC"), multimedia messaging, web browsing, VoIP, multimedia streaming, and other services.

The wireless communication system 100 also includes one or more wireless service nodes, such as one or more base stations 110 or access points 112, 114, and 116, that are communicatively coupled to the wireless communication network 102. In particular, the access points 112, 114, 116 are communicatively coupled to one or more of the access networks, such as packet data network 104, for example, a wireless operator's IP backhaul. It should be noted that the access points 112, 114, 116 can be either wired and/or wireless access points.

In one embodiment, the access points 112, 114, 116 are high speed access points that provide high capacity data services to wireless devices. Each access point 112, 114, 116, can be owned and operated by separate wireless service providers. Alternatively, two or more of the access points 112, 114, 116 can be owned and operated by the same wireless service provider. Also, one or more of the access points 112, 114, 116 can be owned/operated by a third-party that provides access to a wireless provider's services. Also, in one embodiment, a base station 110 and an access point 112, 114, 116 can perform the same functions with respect to embodiments of the present invention.

In one embodiment, the wireless device 108 registers with the access points 112, 114, 116 in order to utilize packet data services provided by a wireless service operator. For example, the wireless device 108 can wirelessly communicate with an access point 112 via the 802.16 technology in order to utilize services provided by a wireless service provider. It should be noted that 802.16 is only used as an example and is not intended to limit the present invention in any way.

Each of the access points 112, 114, 116 comprises a device manager 118, a device handover manager 120, and device service usage data 122. Each of these components is discussed in greater detail below. A billing server 124 is communicatively coupled to the wireless network 102 and includes a billing manager 126 and billing records 128. In one embodiment, the access points 112, 114, 116 communicate service usage information associated with wireless devices 108 to the billing server 124. The billing server 124 manages the service usage data received from the access points 112, 114, 116 via the billing manager 126 for generating billing records 128 for each wireless device 108. The billing manager 126 and billing records 128 are discussed in greater detail below.

Managing Wireless Device Service Usage Across Multiple Access Points

Each access point 112, 114, 116 manages wireless device service usage for its own coverage area. A wireless device, such as wireless device 108, is able to "hop" from one of the access points, such as access point 112, to another of the access points, such as access point 114, while active in a particular session. For example, the wireless device 108 can initiate a communication session while registered with the access point 112 (e.g., a source access point 112) and move into the coverage area of the access point 114 (e.g., a target access point 114) during its current session. As discussed above with respect to conventional wireless communication systems, each access point 112, 114, 116 transmits wireless device service usage data to the billing system 124. For example, as the wireless device 108 moves from access point to access point, each of the access points 112, 114, 116 transmits service usage data to the billing server 124.

In the prior art, when a wireless device roams among access points, a new charging session is required each time a wireless device registers with a new access point. This creates unnecessary overhead at a billing server. Additionally, if a wireless device moves out of a coverage area of an access point prior to the access point sending service usage data to a billing server, this information is not sent to the billing server. Wireless communication system 100, on the other hand, provides for service usage data to be transferred between access points, such as access points 112, 114, 116, as a wireless device, such as wireless device 108, migrates from one access point to another access point. Service usage information is then periodically reported to the billing server 124, thereby reducing traffic at the server 124. When the wireless device 108 registers with an access point 112, the device manager 118 of the access point begins to monitor the services used by the wireless device 108. For example, the device manager 118 monitors a type of services used by the device 108, a duration of use, data volume, and other data. This information then is stored in a service usage database 122.

In one embodiment of the present invention, the device manager 118 also initiates an accounting record with the billing sever 124, for example, via an Authentication, Authorization, Accounting ("AAA") protocol message. For example, the access point 112 can send a DIAMETER ACR-START message to the billing server 124 to initiate the accounting record/charging session. The billing server 124 can respond by transmitting an accounting record interval parameter to the initiating access point 112. For example, the billing manager 126 of the billing server can define how often or at what intervals the access points 112, 114, 116 are to transmit accounting information, e.g., service usage data. The billing server 124 can also indicate how accounting information is to be managed by the access points 112, 114, 116. It should be noted that the present invention is not limited to any of the AAA messages used throughout this discussion. Furthermore, the present invention is able to utilize various AAA protocols such as RADIUS, DIAMETER, and other AAA protocols.

The billing server 124, in one embodiment, can indicate to each access point 112, 114, 116 how to manage accounting information by transmitting a configurable accounting management parameter to the access point. Depending on the state of the configurable accounting management parameter, the access point may manage wireless device service usage and access point migration differently. For example, when an access point 112 establishes a charging session with the billing server 124, the billing server 124 can transmit an INTERIM_ACR_TYPE parameter to the access point 112. This configurable parameter can be set to a value that indicates to the access point 112 how to manage wireless device service usage and access point migration.

Figure 13:
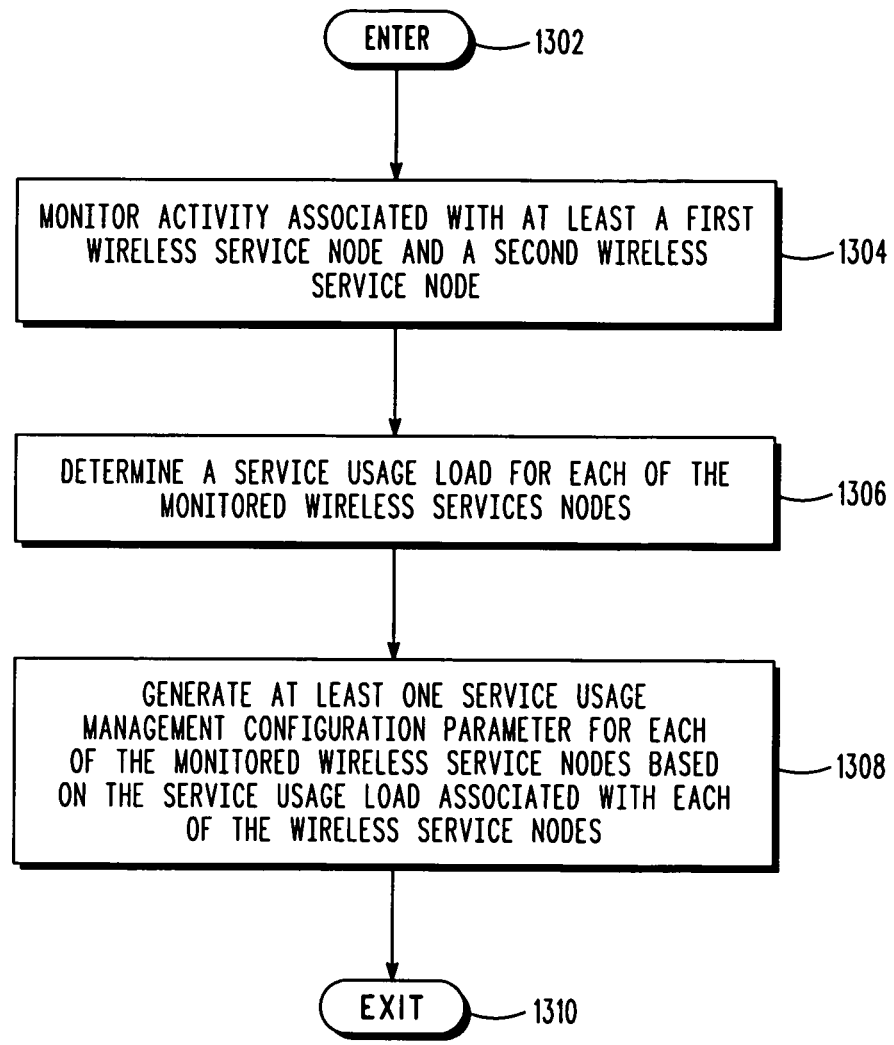
FIG. 13 is an operational flow diagram illustrating one example of a billing server managing wireless service usage and service node migration according to one embodiment of the present invention.

The configurable INTERIM_ACR_TYPE parameter allows a billing server 124 to control the load on the access points 112, 114 as well as the load on the system 100. For example, if, during a hand-off, the source access point 112 has less of a load than the target access point 114, the billing server 124 can select a value of "1" for the INTERIM_ACR_TYPE parameter. If the target access point 114 has less of a load than the source access point 112, the billing server 124 can select a value of "2" for the INTERIM_ACR_TYPE parameter. If the system in general is loaded, the billing server 124 can select a value of "3" for the INTERIM_ACR_TYPE parameter. If both the source access point 112 and the target access point 114 are highly loaded, the billing server 124 can select a value of "4" for the INTERIM_ACR_TYPE parameter. It should be noted that these values are only illustrative and are not intended to limit the present invention in any way. FIG. 13 shows one example of the billing server managing wireless service usage and service node migration using a service usage management configuration parameter such as the configurable accounting management parameter discussed above.

Managing Wireless Device Service Usage and Access Point Migration

Figure 2:
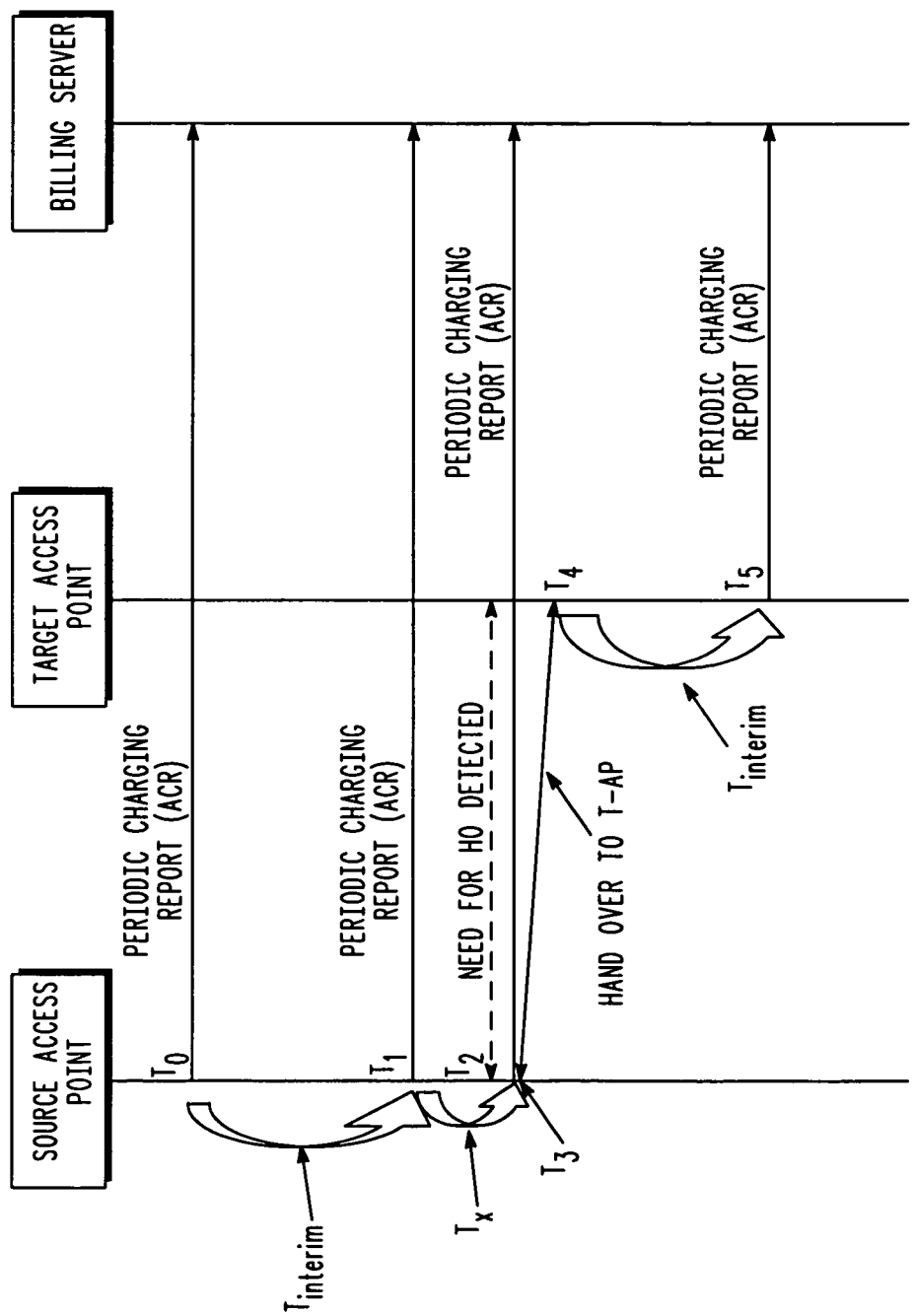
FIGS. 2-5 are signal flow diagrams illustrating methods for managing wireless service usage and wireless service node migration according to various embodiments of the present invention.

FIG. 2 through FIG. 5 illustrate various methods for managing wireless device service usage and access point migration based on the state of the configurable accounting management parameter in accordance with various embodiments of the present invention. FIG. 2 is a signal flow diagram 200 illustrating a first embodiment for managing device service usage and access point migration. Transactional diagram 200 shows events that occur after a wireless device, such as wireless device 108, registers with a source access point, such as access point 112. As discussed above, when the wireless device 108 registers with the access point 112, the device manager 118 of the access point notifies the billing server 124 so that a charging session can be initiated. For example, the access point 112 sends a DIAMETER ACR_START message to the billing server 124. The billing manager 126 of the billing server determines an interval for receiving accounting records from access points 112, 114, 116. The billing manager 126 also sends a configurable parameter, such as INTERIM_ACR_TYPE, to the access point 112 to inform it how to manage device service usage and access point migration. In the example of FIG. 2, the INTERIM_ACR_TYPE is set to a value of "1" or configuration Type 1 is selected. It should be noted that the INTERIM_ACR_TYPE message and its value of "1" are only examples to illustrate the different processes that the billing server 124 can instruct the access points 112, 114, 116 to use for managing device service usage and access point migration.

The access point 112 proceeds to start a periodic timer $T_{interim}$. This timer is set to expire based on the interval determined by the billing server 124 for receiving accounting records. Stated differently, each time the periodic timer $T_{interim}$ expires, the access point 112 transmits an accounting record to the billing server 124 that comprises service usage data 122 monitored during that period of time. For example, at times $T_0$ and $T_1$, the periodic timer $T_{interim}$ has expired and the source access point 112 transmits a periodic charging report (e.g., accounting report) to the billing server 124. In one embodiment, the source access point 112 sends an ACR_INTERIM message comprising accounting information to the billing server 124. The ACR_INTERIM message is a DIAMETER message that indicates a current charging session is being updated.

The billing manager 126 receives the various accounting records from the source access point 112 and updates the billing record(s) 128 maintained by the billing manager for the particular wireless device 108. Based on various predefined triggers, such as length of time a charging session has been open, the size of a charging session records written, and other triggers, the billing manager 126 can close a charging session and if needed open another charging session for the same user session.

If the wireless device 108 enters into a coverage area of another access point, i.e., a target access point such as access point 114 ("T-AP"), the device handover manager 120 of the source access point 112, at time $T_2$, detects this and signals the source access point 112 to send a final accounting record to the billing server 124. The device handover manager 120 of the source access point 112, at time $T_3$, then transfers a context record over to the target access point 114. The context record can comprise services usage data, timer data, and other data for a time interval $T_x$ corresponding to a time interval between the time, $T_1$, that records were most recently sent by the source access point 112 to the billing server 124 (not counting the post-handoff final accounting record) and the time, $T_3$, that records are sent to the target access point 114. However, in the embodiment depicted in FIG. 2, the context transferred to the target access point 114 from the source access point 112 may not include any context information or timer data for the time interval $T_x$. This is because the last accounting record is to be sent from the source access point 112 at time $T_3$ and not at time $T_1$. The target access point 114 then resets/starts the $T_{interim}$ timer at time $T_4$ and when $T_{interim}$ expires the target access point 114 sends out the next ACR record at time $T_5$.

The timer data for time interval $T_x$ indicates how much time has elapsed since the start of the $T_{interim}$ timer. The timer data for time interval $T_x$ can also indicate how much time remains until the next accounting record is to be sent to the billing server 124. At time $T_3$, an accounting record is sent to the billing server 124 from the source access point 112. At the same time, a context transfer occurs between the source access point 112 and the target access point 114. Between times $T_3$ and $T_4$, there is a small but finite amount of data activity. This service usage data can either be dropped at the source access point 112 (e.g., the user has moved out of the range of the access point) or buffered at the source access point 112 and forwarded to the target access point 114. If this service usage data is buffered and forwarded, the target access point 114 reports this data to the billing server 124 as part of its own normal reporting procedures.

The target access point 114, at time $T_4$, resets the periodic timer $T_{interim}$ and begins to monitor service usage by the wireless device 108. Any buffered data from the source access point 112 is forwarded to the user at time T4 and is counted as traffic under the target access point 114. It should be noted that the service usage monitored by the target access point 114 is part of the same charging session initiated by the source access point 112. Stated differently, a new charging session is not initiated when the wireless device 108 migrates from the source access point 112 to one or more subsequent access points 114, 116. When the periodic timer $T_{interim}$ expires, such as at time $T_5$, the target access point 114 transmits accounting records to the billing server 124 for service usage monitoring since timer $T_{interim}$ was reset. The process above repeats for each access point the wireless device 108 migrates to.

Figure 3:
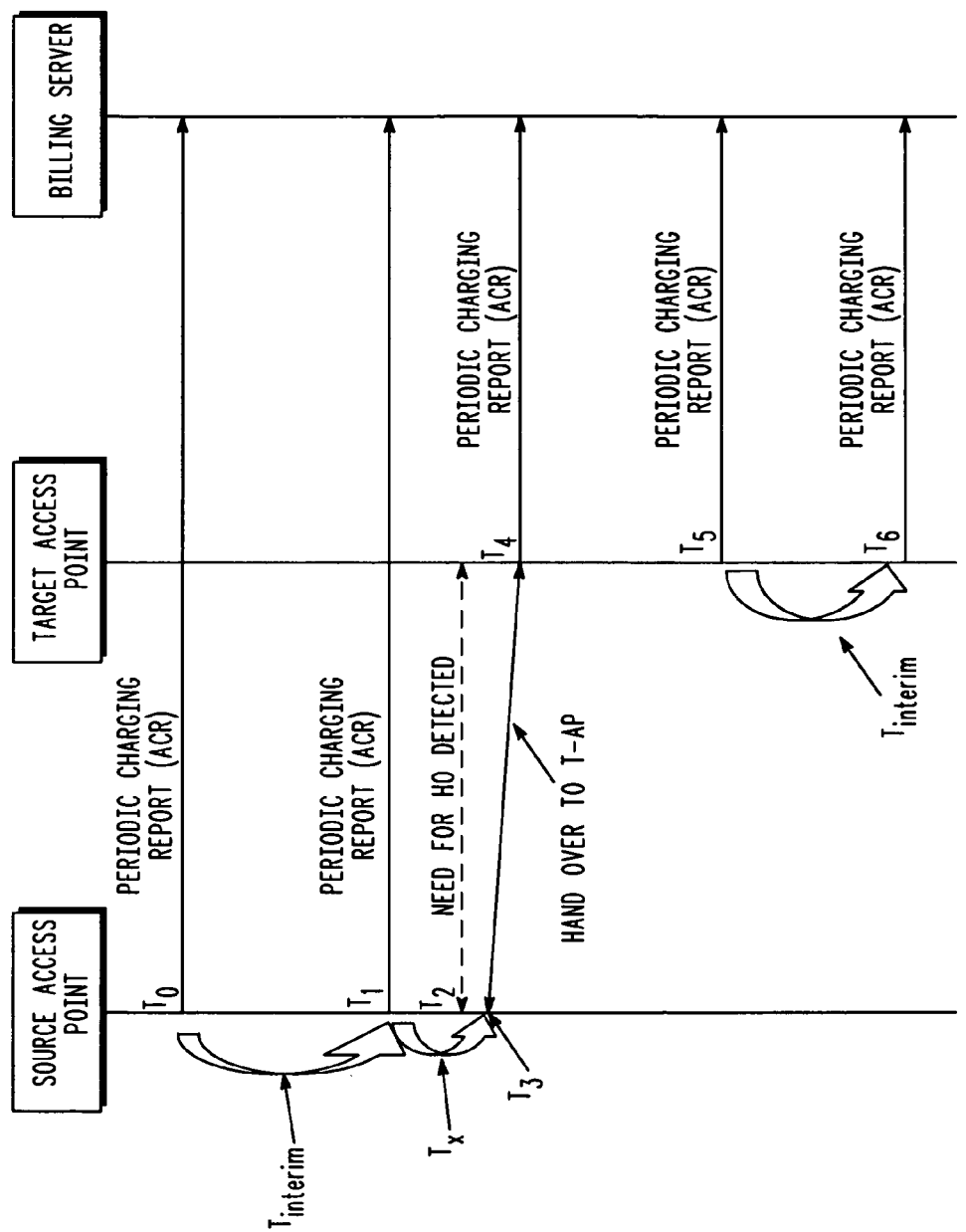

FIG. 3 shows a signal flow diagram 300 illustrating a second embodiment for managing device service usage and access point migration. Similar to transactional diagram 200, transactional diagram 300 shows events that occur after a wireless device, such as wireless device 108, registers with a source access point, such as access point 112. As discussed above, after a charging session is initiated and the interval for receiving accounting records from access points 112, 114, 116 is determined, the billing manager 126 of billing server 124 sends a configurable accounting parameter to the source access point 112. In the embodiment depicted in FIG. 3, the configurable accounting parameter (e.g., INTERIM_ACR_TYPE) is set to a value of "2" or configuration Type 2 is selected. It should be noted that the value of "2" is only an example for illustrating the different processes that the billing server 124 can instruct the access points 112, 114, 116 to use for managing device service usage and access point migration.

Similar to the discussion above with respect to FIG. 2, the source access point 112 transmits an accounting record that comprises service usage data 122 to the billing server 124 whenever the periodic timer $T_{interim}$ expires, such as at time $T_0$ and time $T_1$. If the wireless device 108 enters into a coverage area of another access point, i.e., a target access point such as access point 114, the device handover manager 120 of the source access point 112, at time $T_2$, detects this migration. The device handover manager 120 of the source access point, at time $T_3$, then transfers a context record over to the target access point 114. The context record can comprise services usage data, timer data, and other data for time interval $T_x$ corresponding to a time interval between the time, $T_1$, that records were most recently sent by the source access point 112 to the billing server 124 and the time, $T_3$, that records are sent to the target access point 114. The timer data can include information as discussed above with respect to FIG. 2

In the embodiment depicted in FIG. 3, the context record also includes the service usage data monitored by the source access point 112. In other words, the source access point 112 does not transmit an accounting record to the billing server 124 at hand-off time. Instead, the target access point 114 receives this service usage information (from $T_1$ to $T_3$) and, immediately after the handoff is complete, at time $T_4$, transmits an accounting record comprising the service usage data of the source access point 112 (for time interval $T_x$) to the billing server 124 once the context record is received. Between time $T_3$ and time $T_4$ there is a small, but finite amount of data activity. This data can either be dropped at the source access point 112 (e.g., the user has moved out of the range of the source access point 112) or buffered at the source access point 112 and forwarded to the target access point 114. If this data is buffered and forwarded, the target access point 114 reports this data to the billing server 124 as part of its own normal reporting procedure.

The target access point 114 restarts the periodic timer $T_{interim}$ after sending an accounting record at time $T_4$ and begins to monitor service usage by the wireless device 108. It should be noted that the service usage monitored by the target access point 114 is part of the same charging session initiated by the source access point 112. Any buffered data received from the source access point 112 is forwarded to the wireless device 108 at time $T_4$ and is counted as traffic under the target access point 114. When the periodic timer $T_{interim}$ expires, such as at time $T_5$ and time $T_6$, the target access point 114 transmits accounting records to the billing server 124 for service usage monitoring during those time intervals. The process above repeats for each access point the wireless device 108 migrates to.

Figure 4:
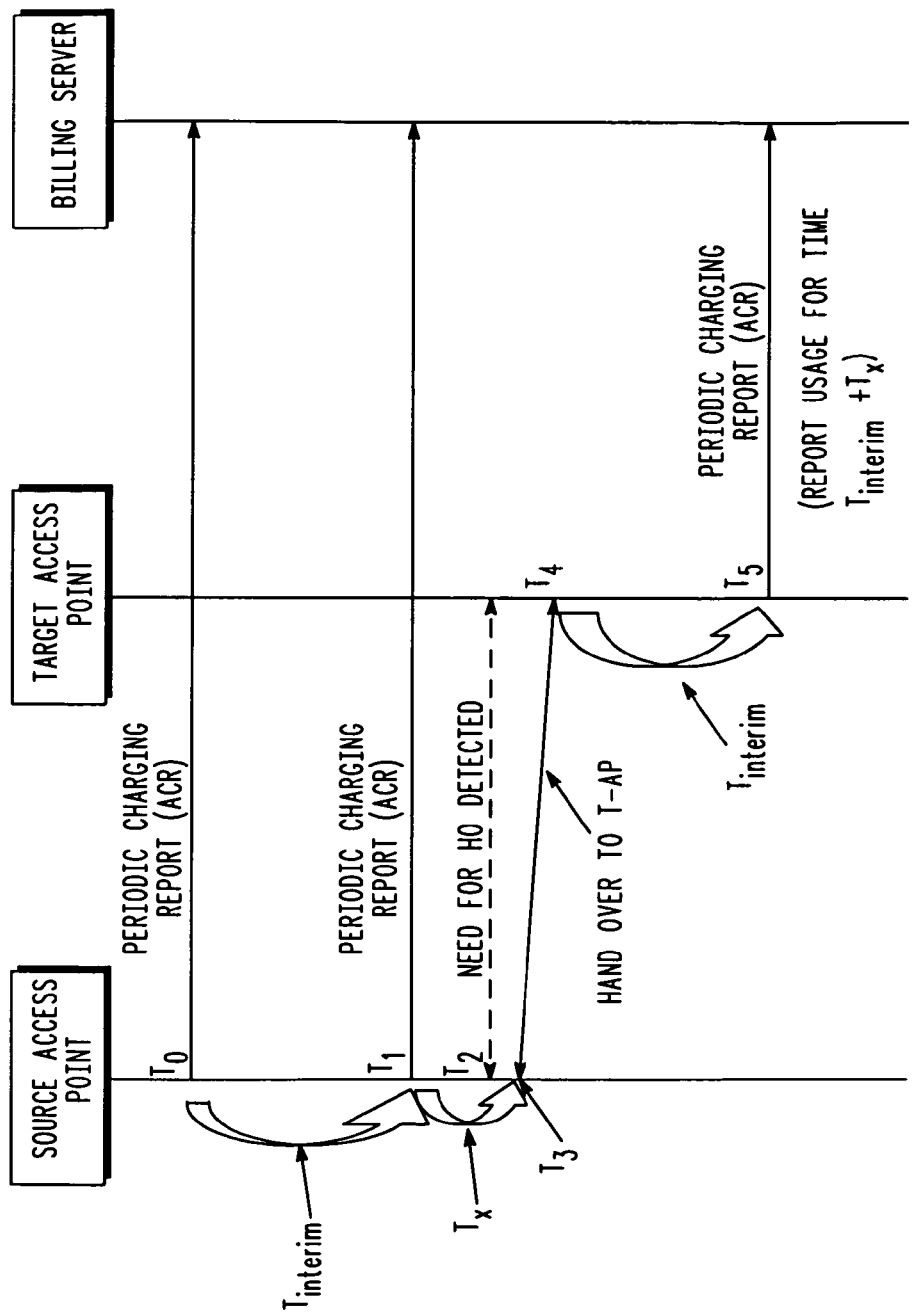

FIG. 4 shows a signal flow diagram 400 illustrating a third embodiment for managing device service usage and access point migration. Similar to transactional diagram 200, transactional diagram 400 shows events that occur after a wireless device, such as wireless device 108, registers with a source access point, such as access point 112. As discussed above, after a charging session is initiated and the interval for receiving accounting records from access points 112, 114, 116 is determined, the billing manager sends a configurable accounting parameter to the source access point 112. In the embodiment depicted in FIG. 4, the configurable accounting parameter (e.g., INTERIM_ACR_TYPE) is set to a value of "3" or configuration Type 3 is selected. It should be noted that the value of "3" is only an example for illustrating the different processes that the billing server 124 can instruct the access points 112, 114, 116 to use for managing device service usage and access point migration.

Similar to the discussion above with respect to FIG. 2, the source access point 112 transmits an accounting record that comprises service usage data 122 to the billing server 124 whenever the periodic timer $T_{interim}$ expires, such as at time $T_0$ and time $T_1$. If the wireless device 108 enters into a coverage area of another access point, i.e., a target access point such as access point 114, the device handover manager 120 of the source access point 112, at time $T_2$, detects this migration. The device handover manager 120 of the source access point, at time $T_3$, then transfers a context record over to the target access point 114. The context record can comprise services usage data, timer data, and other data for time interval $T_x$ corresponding to a time interval between the time, $T_1$, that records were most recently sent by the source access point 112 to the billing server 124 and the time, $T_3$, that records are sent to the target access point 114. The timer data can include information as discussed above with respect to FIG. 2.

In the embodiment depicted in FIG. 4, the context record also includes the service usage data monitored by the source access point 112. In other words, the source access point 112 does not transmit an accounting record to the billing server 124 at hand-off time. Instead, the target access point 114 receives this service usage information and, at time $T_4$, starts the periodic timer $T_{interim}$ and begins to monitor service usage by the wireless device 108. Between time $T_3$ and time $T_4$ there is a small, but finite amount of data activity. This data can either be dropped at the source access point (e.g., the user has moved out of the range of the source access point 112) or buffered at the source access point 112 and forwarded to the target access point 114. If this data is buffered and forwarded, the target access point 114 reports this data to the billing server 124 as part of its own normal reporting procedure. It should be noted that the service usage monitored by the target access point 114 is part of the same charging session initiated by the source access point 114.

Once the $T_{interim}$ expires, such as at time $T_5$, the target access point 114 transmits accounting records to the billing server 124 comprising service usage data monitored by the target access point 114 during the time interval of $T_{interim}$ under the target access point 114 and service usage data for timer interval $T_x$ under the source access point 112 as reported during the hand-off context transfer. The process above repeats for each access point the wireless device 108 migrates to.

Figure 5:
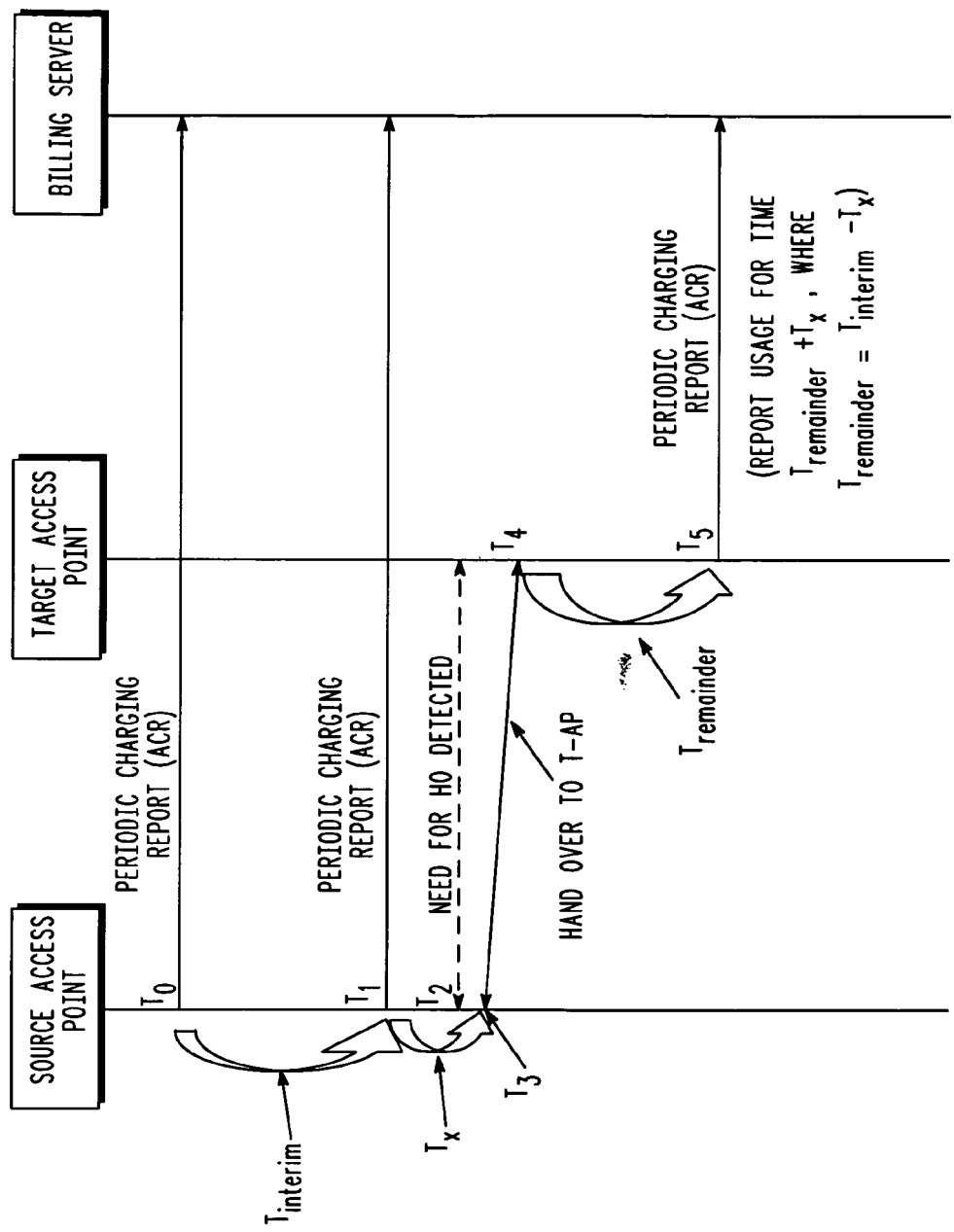

FIG. 5 shows a signal flow diagram 500 illustrating a fourth embodiment for managing device service usage and access point migration. Similar to transactional diagram 200, transactional diagram 500 shows events that occur after a wireless device, such as wireless device 108, registers with a source access point, such as access point 112. As discussed above, after a charging session is initiated and the interval for receiving accounting records from access points 112, 114, 116 is determined, the billing manager 126 sends a configurable accounting parameter to the source access point 112. In the example of FIG. 5, the configurable accounting parameter (e.g., INTERIM_ACR_TYPE) is set to a value of "4" of configuration Type 4 is selected. It should be noted that the value of "4" is only an example for illustrating the different processes that the billing server 124 can instruct the access points 112, 114, 116 to use for managing device service usage and access point migration.

Similar to the discussion above with respect to FIG. 2, the source access point 112 transmits an accounting record that comprises service usage data 122 to the billing server 124 whenever the periodic timer $T_{interim}$ expires, such as at time $T_0$ and time $T_1$. If the wireless device 108 enters into a coverage area of another access point, i.e., a target access point such as access point 114, the device handover manager 120 of the source access point 112, at time $T_2$, detects this migration. The device handover manager 120 of the source access point, at time $T_3$, then transfers a context record over to the target access point 114. The context record can comprise services usage data, timer data, and other data for time interval $T_x$ corresponding to a time interval between the time, $T_1$, that records were most recently sent by the source access point 112 to the billing server 124 and the time, $T_3$, that records are sent to the target access point 114. The timer data can include information as discussed above with respect to FIG. 2.

In the example of FIG. 5, the context record includes the service usage data monitored by the source access point 112 and an indication of how much time has elapsed during the current $T_{interim}$ interval. As discussed above, the context transfer occurs at time $T_3$ between the source access point 112 and the target access point 114. Between time $T_3$ and time $T_4$ there is a small, but finite amount of data activity. This data can either be dropped at the source access point 112 (e.g., the user has moved out of the range of the source access point 112) or buffered the source access point and forwarded to the target access point. If this data is buffered and forwarded, the target access point reports this data to the billing server 124 as part of its own normal reporting procedure.

The target access point 114, at time $T_4$, starts timer $T_{remainder}$, which is equal to $T_{interim}$ less time elapsed $T_x$. When the timer $T_{remainder}$ expires, such as at time $T_5$, the target access point 114 transmits accounting records to the billing server 124 comprising service usage data received from the source access point 112 and service usage data monitored at the target access point 114 since the timer $T_{remainder}$ was initialized at time $T_4$ (under that target access point 114) and $T_x$ (under the source access point 112, as reported during the hand-off context transfer). The process above repeats for each access point the wireless device 108 migrates to.

It should be noted that in each of the examples above, if access point migration is unsuccessful (e.g., a wireless device 108 cannot migrate to a target access point) the source access point 112 can notify the billing server 124. This notification, in one example, can be an ACR_STOP message that includes any unreported service usage data since the last accounting report was sent. In another embodiment, each of the examples above can utilize a hop count. For example, each device handover manager 120 can keep a hop count, which is a count of how many times a wireless device has migrated to a different access point. The hop count can be passed to a target access point, such as access point 114, from a source access point, such as access point 112, in the context record. When the hop count reaches a reaches a configurable threshold, an accounting record is generated by that particular access point and sent to the billing server 124. This helps avoid loss of revenue due to data reporting errors for cases where handover frequency between peer access points is greater than the periodic time for reporting data usage. The utilization of a hop count as discussed above can be performed any time during a handover procedure once the hop count threshold is reached.

Wireless Device

Figure 6:
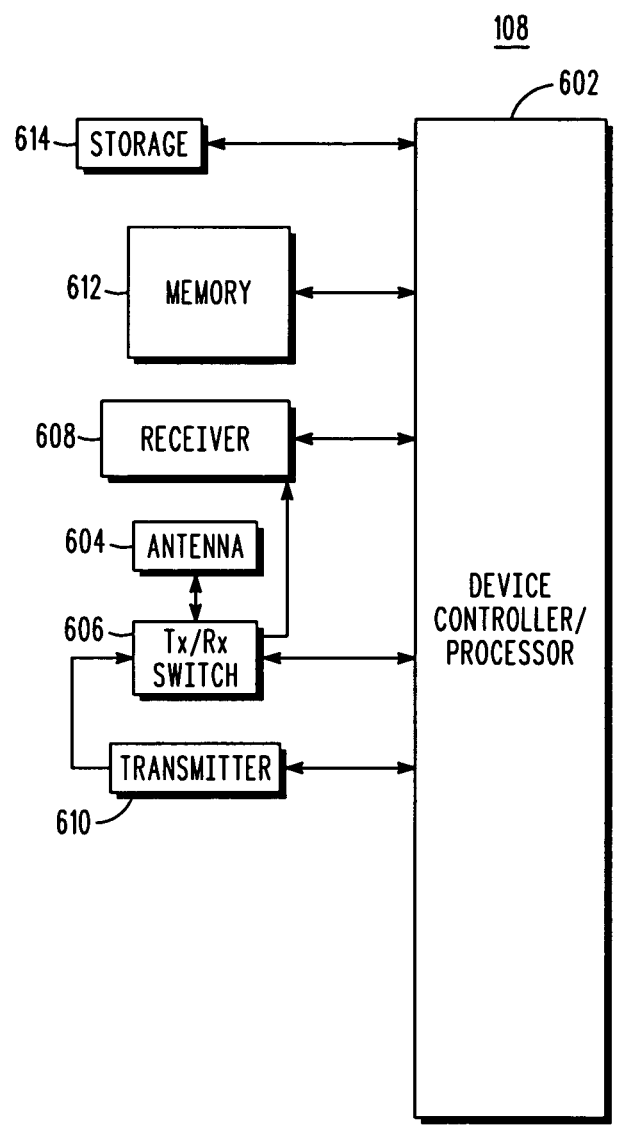
FIG. 6 is a block diagram illustrating a detailed view of a wireless device according to one embodiment of the present invention.

FIG. 6 is a block diagram illustrating a detailed view of the wireless device 108 according to one embodiment of the present invention. It is assumed that the reader is familiar with wireless communication devices. To simplify the present description, only that portion of a wireless communication device that is relevant to the present invention is discussed. The wireless device 108 operates under the control of a device controller/processor 602, that controls the sending and receiving of wireless communication signals. In receive mode, the device controller 602 electrically couples an antenna 604 through a transmit/receive switch 606 to a receiver 608. The receiver 608 decodes the received signals and provides those decoded signals to the device controller 602.

In transmit mode, the device controller 602 electrically couples the antenna 604, through the transmit/receive switch 606, to a transmitter 610. It should be noted that in one embodiment, the receiver 608 and the transmitter 610 are a dual mode receiver and a dual mode transmitter for receiving/transmitting over various access networks providing different air interface types. In another embodiment a separate receiver and transmitter is used for each of type air interface.

The device controller 602 operates the transmitter and receiver according to instructions stored in a memory 612. These instructions include, for example, a neighbor cell measurement-scheduling algorithm. The wireless device 108, also includes non-volatile storage memory 614 for storing, for example, an application waiting to be executed (not shown) on the wireless device 108.

Information Processing System

Figure 7:
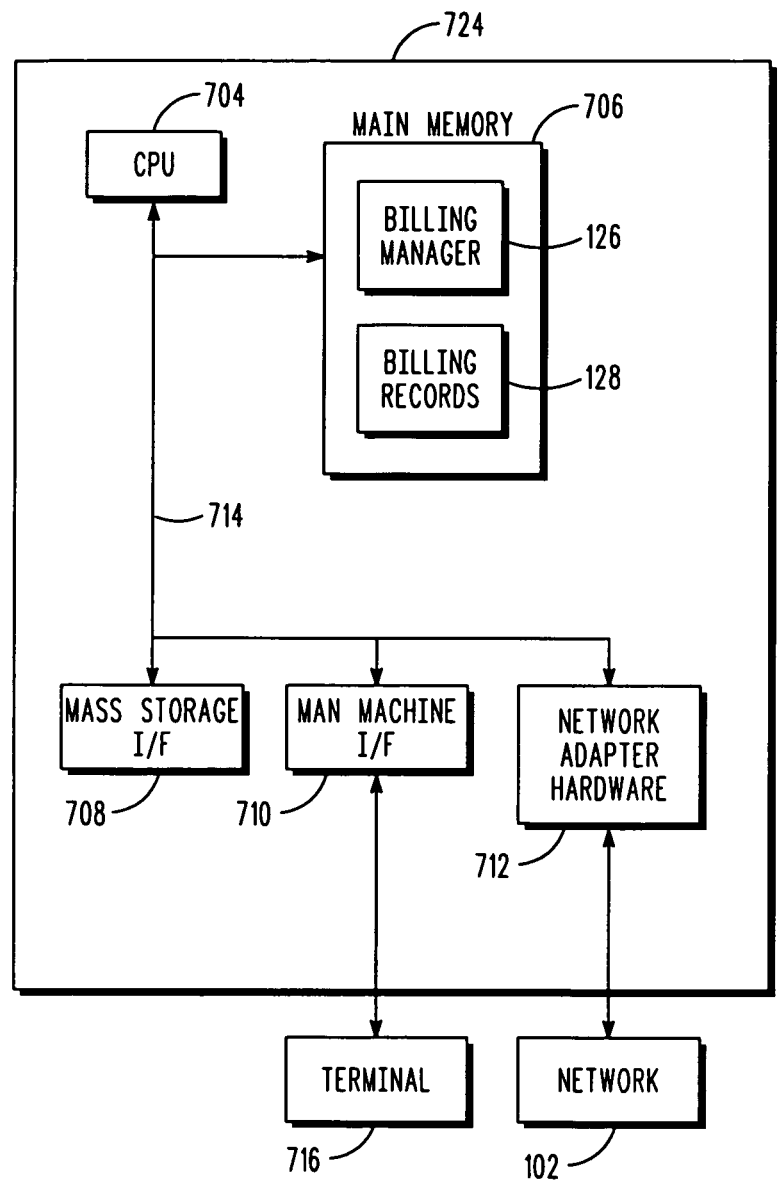
FIG. 7 is a block diagram illustrating a detailed view of an information processing system according to one embodiment of the present invention.

FIG. 7 is a block diagram illustrating a more detailed view of an information processing system 724, such as the billing server 124 (e.g., an accounting server, a charging server, a charging gateway, a billing gateway, an accounting gateway, or the like). The information processing system 724 is based upon a suitably configured processing system adapted to implement the embodiment of the present invention. For example, a personal computer, workstation, or the like, may be used. The information processing system 724 includes a computer 702. The computer 702 has a processor 704 that is connected to a main memory 706, a mass storage interface 708, a man-machine interface 710, and network adapter hardware 712. A system bus 714 interconnects these system components.

The main memory 706 includes the billing manager 126 and billing records 128. Although illustrated as concurrently resident in the main memory 706, it is clear that respective components of the main memory 706 are not required to be completely resident in the main memory 706 at all times or even at the same time. One or more of these components can be implemented as hardware.

The mass storage interface 708 can store data on a hard-drive or media such as a CD. Man-machine interface 710 allows technicians and administrators to directly connect to the information processing system 724 via one or more terminals 716. The network adapter hardware 712 is used to provide an interface to the wireless communication network 102, a public network such as the Internet, and other networks. Various embodiments of the present invention are able to be adapted to work with any data communications connections including present day analog and/or digital techniques or via a future networking mechanism.

Access Point

Figure 8:
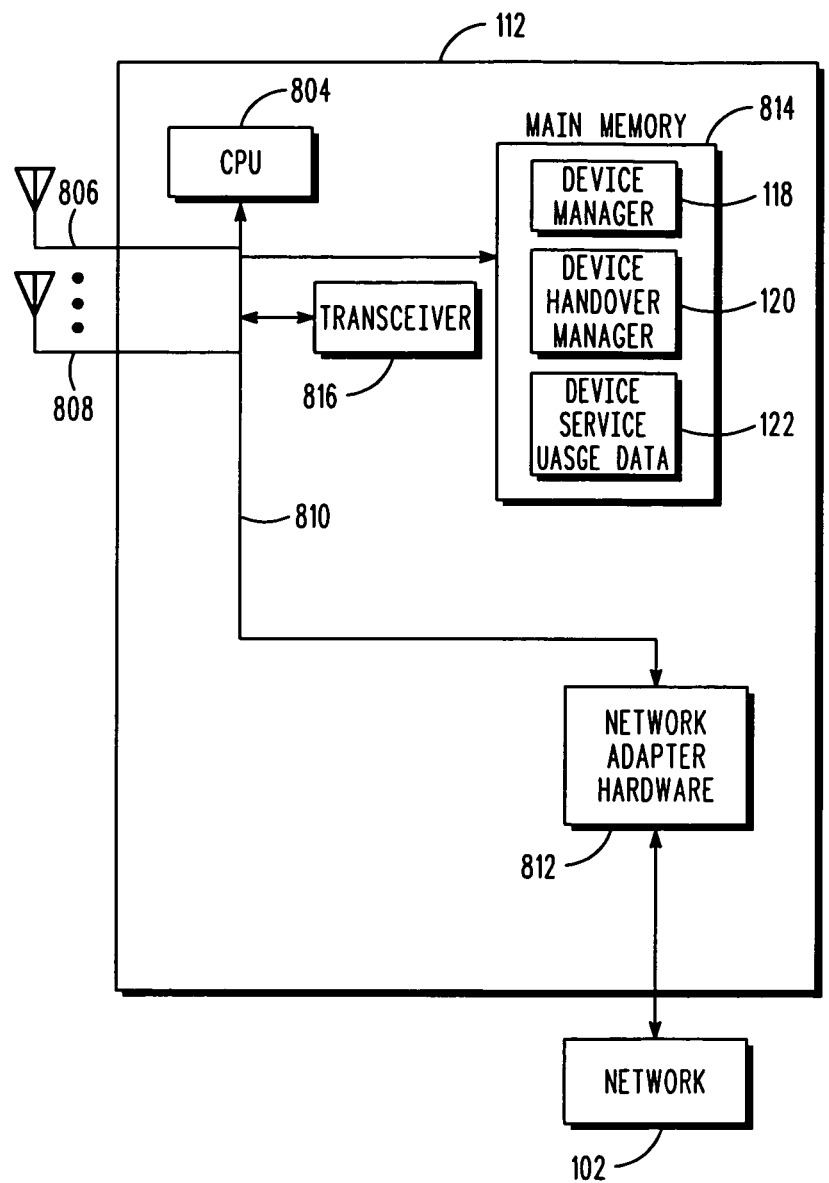
FIG. 8 is a block diagram illustrating a detailed view of an a wireless service node according to one embodiment of the present invention.

FIG. 8 is a block diagram illustrating a more detailed view of a wireless service node, such as access points 112, 114, 116 or base station 110. While access point 112 is depicted in FIG. 8, one of ordinary skill in the art realizes that the description of access point 112 applies equally to access points 114 and 116 and to base station 110. It is assumed that the reader is familiar with access points. To simplify the present description, only that portion of an access point 112 that is relevant to the present invention is discussed. The access point 112 operates under the control of a device controller/processor 804, that controls the sending and receiving of wireless/wired communication signals via a transceiver 816 communicatively coupled to one or more antennas 806, 808. The access point 112 comprises a memory 806 including the device manager 118, the device handover manager 120, and device service usage data 122, which have been discussed in greater detail above. The antenna(s) 806, 808, device controller/processor 804, main memory 814, transceiver 816, and network adapter hardware 812 are communicatively coupled together by a system bus 810.

The network adapter hardware 812 is used to provide an interface to the wireless communication network 102, a public network such as the Internet, and other networks. Various embodiments of the present invention are able to be adapted to work with any data communications connections (wired and/or wireless) including present day analog and/or digital techniques or via a future networking mechanism.

Processes For Managing Service Usage and Access Point Migration at the Billing Server The rules of exchanging service usage information can be changed at the billing server on a per session, per day or periodic basis, depending on the conditions in the network. These dynamic rules will govern the behavior of the source access point and target access point on how to treat the service usage data. These rules are dynamic and they can be reconfigured by another application that would set the behaviors of the source access point and the target access points for service usage data transfer. The billing server 124, in one embodiment, transmits wireless service usage management configuration parameters based on changing the rules.

Figure 9:
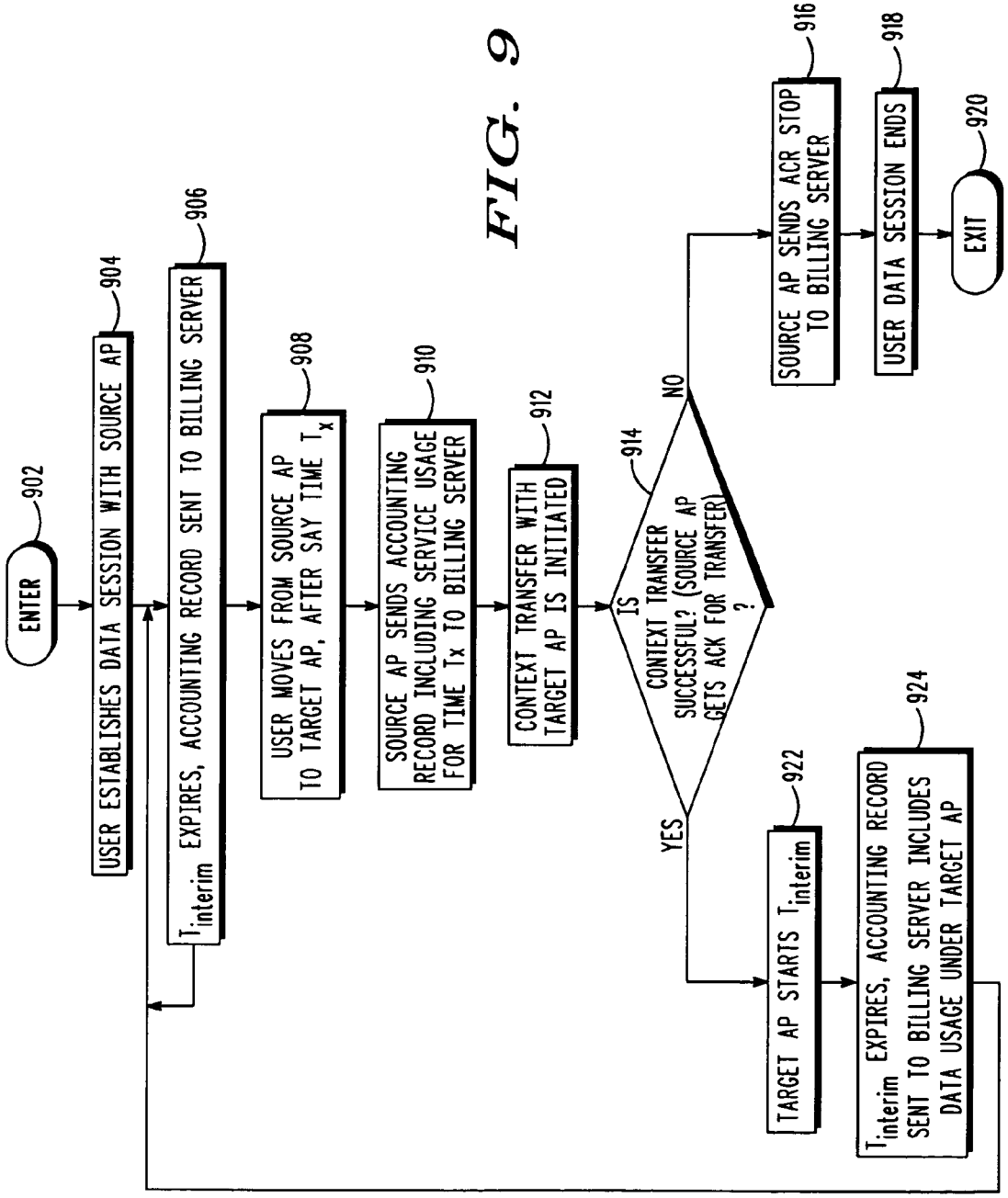
FIGS. 9-12 are operational flow diagrams illustrating various processes for managing wireless service usage and migration of a wireless device between multiple wireless service nodes according to one embodiment of the present invention.

FIG. 9 is an operational flow diagram illustrating a process of managing wireless device service usage and access point migration in accordance with an embodiment of the present invention. The operational flow diagram of FIG. 9 begins at step 902 and flows directly to step 904. A wireless device 108, at step 904, establishes a data session with a source access point 112. The device manager 118 of the source access point monitors the services used by the wireless device 108. An accounting timer, at step 906, expires and the source access point 112 transmits an accounting record, including service usage data monitored during the timer period, to the billing server 124. The process is repeated whenever the accounting timer expires.

The wireless device 108, at step 908, migrates from the source access point 112 to a target access point 114 after expiration of a time interval $T_x$ since the accounting timer last expired, which expiration occurs within the current accounting time period. Stated differently, the wireless device 108 migrates to the target access point 114 prior to the accounting timer expiring. The source access point 112, at step 910, sends an accounting record to the billing server 124 that includes services usage data monitored since the last record was sent, that is, service usage data monitored during the time interval $T_x$. The source access point 112, at step 912, initiates a context transfer with the target access point 114. The source access point 112, at step 914, determines if the context transfer was successful. For example, the device handover manager 120 of the source access point may determine if an ACK was received from the target access point 114. If the result of this determination is negative, the source access point 112, at step 916, sends an ACR_STOP message to the billing server 124. The wireless device 108 charging session, at step 918, is terminated. The operational flow then exits at step 920.

If the result of the determination is positive, the target access point 114, at step 922, starts the accounting timer. The accounting timer, at step 924, expires and the target access point 114 sends an accounting record to the billing server 124 that includes service usage data monitored by the target access point 114 during the accounting timer interval. The operational flow returns to step 906.

Figure 10:
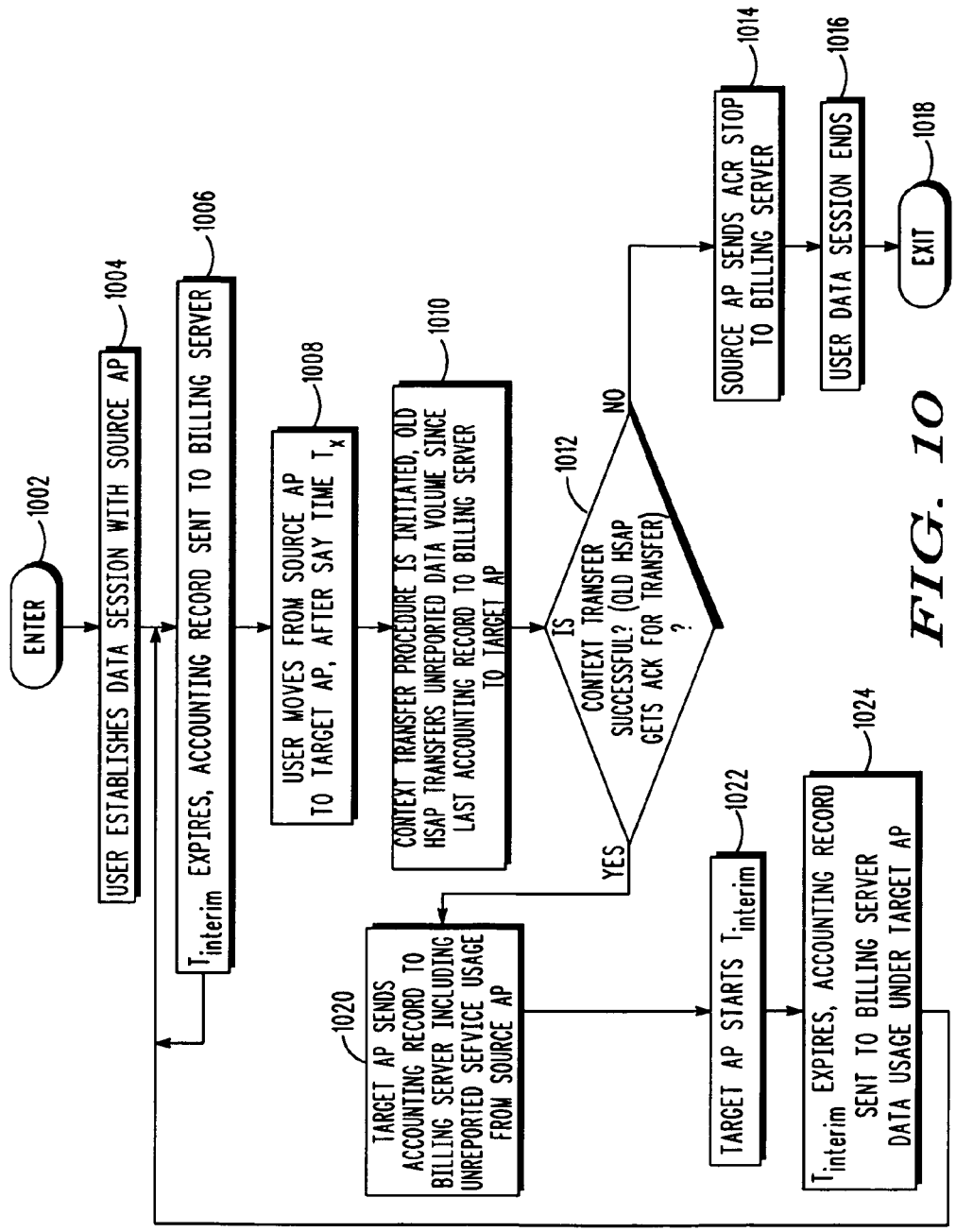

FIG. 10 is an operational flow diagram illustrating a process of managing wireless device service usage and access point migration in accordance with another embodiment of the present invention. The operational flow diagram of FIG. 10 begins at step 1002 and flows directly to step 1004. A wireless device 108, at step 1004, establishes a data session with a source access point 112. The device manager 118 of the source access point monitors the services used by the wireless device 108. An accounting timer, at step 1006, expires and the source access point 112 transmits an accounting recording including service usage data monitored during the timer period to the billing server 124. The process is repeated whenever the accounting timer expires.

The wireless device 108, at step 1008, migrates from the source access point 112 to a target access point 114 after expiration of a time interval $T_x$ since the accounting timer last expired, which expiration occurs within the current accounting time period. Stated differently, the wireless device 108 migrates to the target access point 114 prior to the accounting timer expiring. The source access point 112, at step 1010, initiates a context transfer with the target access point 114. The context transfer includes unreported service data usage at the source access point (e.g., service data usage monitored since the last accounting record was sent to the billing server 124, that is, service usage data monitored during time interval $T_x$). The source access point 112, at step 1012, determines if the context transfer was successful. For example, the device handover manager 120 of the source access point determines if an ACK was received from the target access point 114. If the result of this determination is negative, the source access point 112, at step 1014, sends an ACR_STOP message to the billing server 124. The wireless device 108 charging session, at step 1016, is terminated. The operational flow then exits at step 1018.

If the result of the determination is positive, the target access point 114, at step 1020, sends an accounting record to the billing server 124 that includes the unreported service usage monitored by the source access point 112. The target access point 114, at step 1022, starts the accounting timer. The accounting timer, at step 1024, expires and the target access point 114 sends an accounting record to the billing server 124 that includes service usage data monitored by the target access point 114 during the accounting timer interval. The operational flow returns to step 1006.

Figure 11:
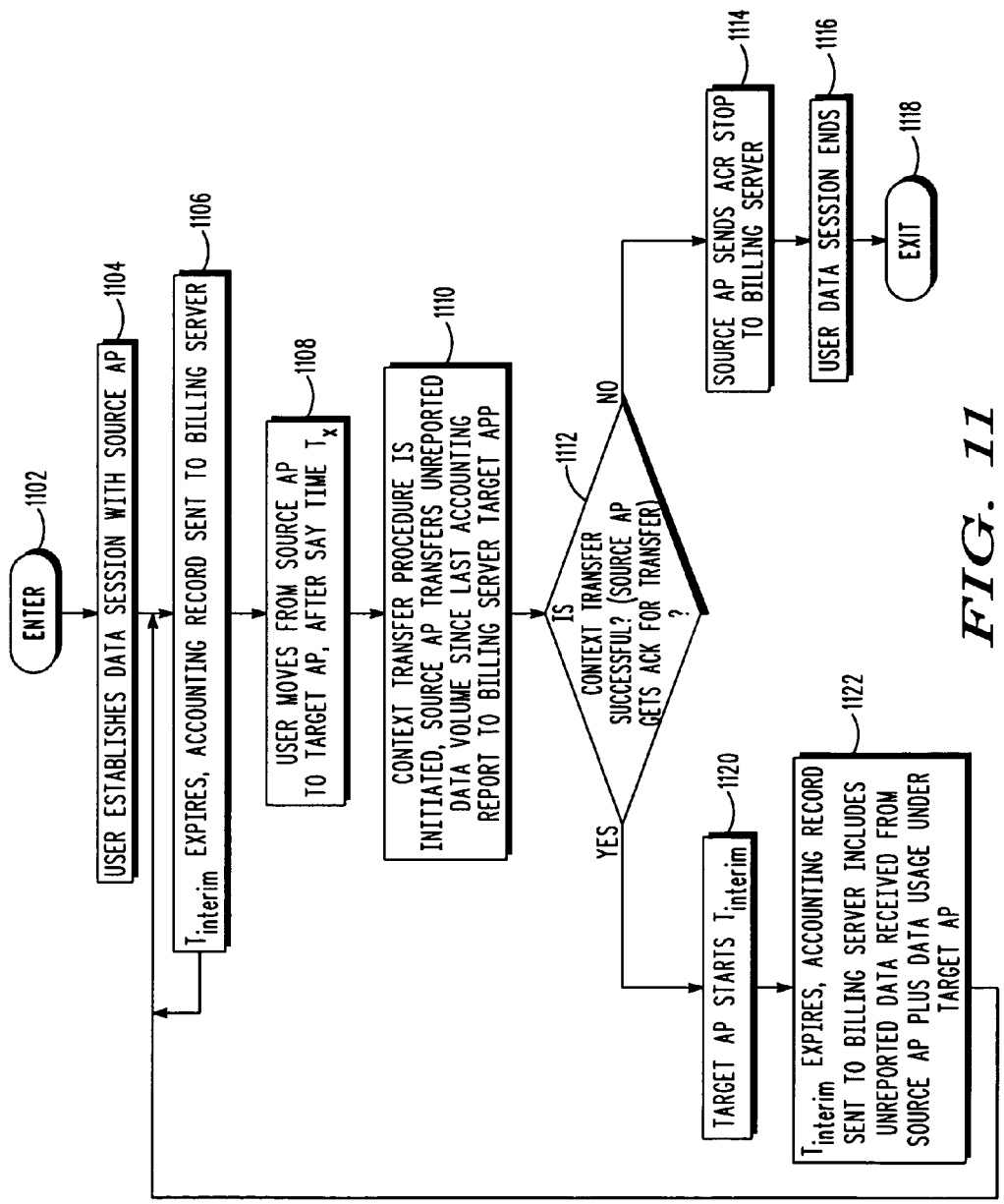

FIG. 11 is an operational flow diagram illustrating another process of managing wireless device service usage and access point migration. The operational flow diagram of FIG. 11 begins at step 1102 and flows directly to step 1104. A wireless device 108, at step 1104, establishes a data session with a source access point 112. The device manager 118 of the source access point monitors the services used by the wireless device 108. An accounting timer, at step 1106, expires and the source access point 112 transmits an accounting recording including service usage data monitored during the timer period to the billing server 124. The process is repeated whenever the accounting timer expires.

The wireless device 108, at step 1108, migrates from the source access point 112 to a target access point 114 after expiration of a time interval $T_x$ since the accounting timer last expired, which expiration occurs within the current accounting time period. Stated differently, the wireless device 108 migrates to the target access point 114 prior to the accounting timer expiring. The source access point 112, at step 1110, initiates a context transfer with the target access point 114. The context transfer includes unreported service data usage at the source access point 112 (e.g., service data usage monitored since the last accounting record was sent to the billing server 124, that is, service data usage monitored during time interval $T_x$). The source access point 112, at step 1112, determines if the context transfer was successful. For example, the device handover manager 120 of the source access point determines if an ACK was received from the target access point 114. If the result of this determination is negative, the source access point 112, at step 1114, sends an ACR_STOP message to the billing server 124. The wireless device 108 charging session, at step 1116, is terminated. The operational flow then exits at step 1118.

If the result of the determination is positive, the target access point 114, at step 1120, starts the accounting timer. The accounting timer, at step 1122, expires and the target access point 114 sends an accounting record to the billing server 124 that includes service usage data monitored by the target access point 114 during the accounting timer interval and the unreported service usage data from the source access point 114. The operational flow returns to step 1106.

Figure 12:
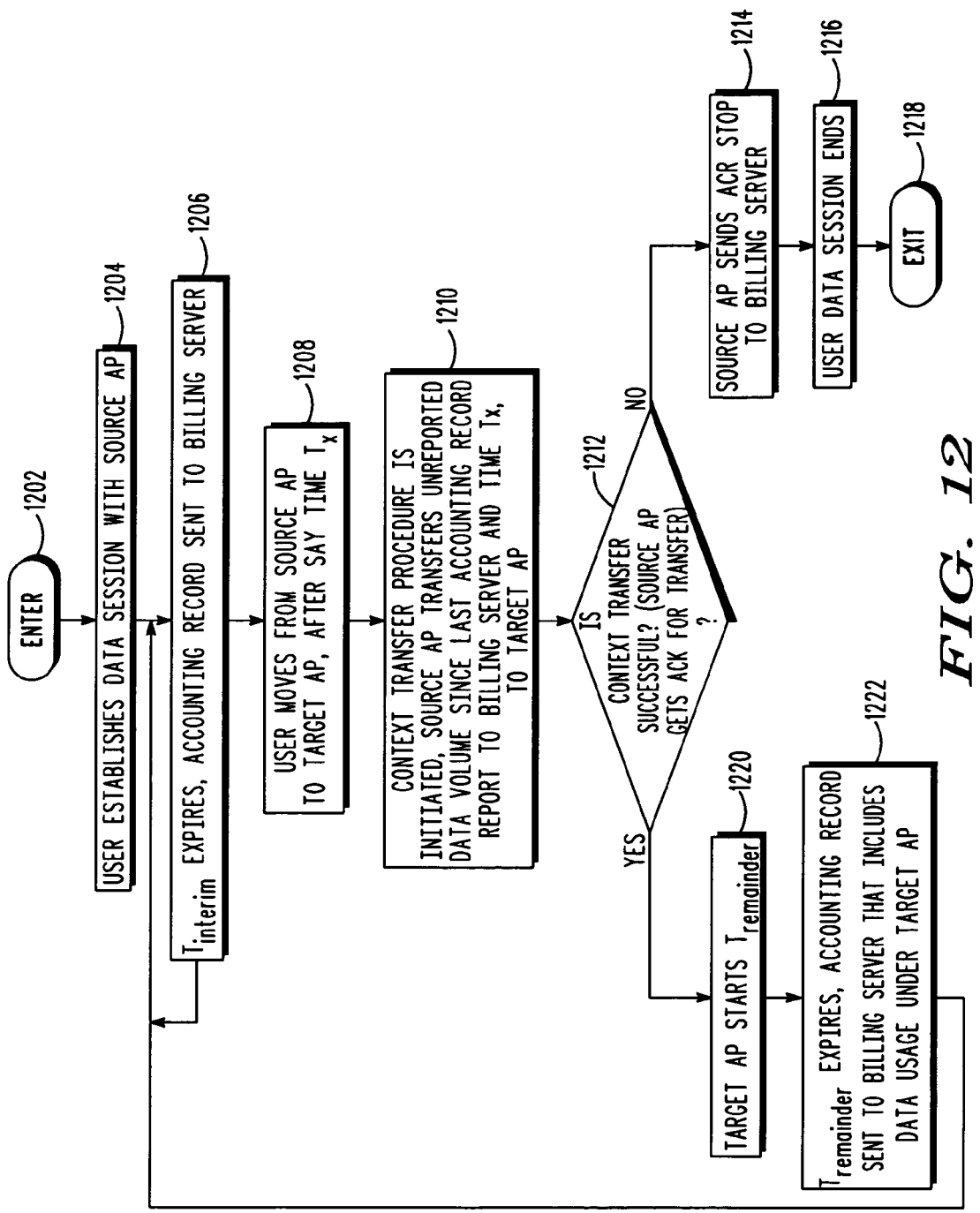

FIG. 12 is an operational flow diagram illustrating yet another process of managing wireless device service usage and access point migration. The operational flow diagram of FIG. 12 begins at step 1202 and flows directly to step 1204. A wireless device 108, at step 1204, establishes a data session with a source access point 122. The device manager 118 of the source access point monitors the services used by the wireless device 108. An accounting timer, at step 1206, expires and the source access point 112 transmits an accounting recording including service usage data monitored during the timer period to the billing server 124. The process is repeated whenever the accounting timer expires.

The wireless device 108, at step 1208, migrates from the source access point 112 to a target access point 114 after expiration of a time interval $T_x$ since the accounting timer last expired, which expiration occurs within the current accounting time period. Stated differently, the wireless device 108 migrates to the target access point 114 prior to the accounting timer expiring. The source access point 112, at step 1210, initiates a context transfer with the target access point 114. The context transfer includes unreported service data usage at the source access point 112 (e.g., service data usage monitored since the last accounting record was sent to the billing server 124, that is, service usage data monitored during time interval $T_x$) and an indication of how much time is left until the accounting timer expires. The source access point 112, at step 1212, determines if the context transfer was successful. For example, the device handover manager 120 of the source access point determines if an ACK was received from the target access point 114. If the result of this determination is negative, the source access point 112, at step 1214, sends an ACR_STOP message to the billing server 124. The wireless device 108 charging session, at step 1216, is terminated. The operational flow then exits at step 1218.

If the result of the determination is positive, the target access point 114, at step 1220, starts a $T_{remainder}$ timer, which is equal to the accounting timer less time elapsed since the accounting timer was started. The $T_{remainder}$ timer, at step 1222, expires and the target access point 114 sends an accounting record to the billing server 124 that includes service usage data monitored by the target access point 114 during the $T_{remainder}$ timer interval and the unreported service usage data from the source access point 114. The operational flow returns to step 1106.

Process For Managing Wireless Service Usage And Service Node Migration

FIG. 13 shows one example of the billing server 124 managing wireless service usage and service node migration using a service usage management configuration parameter such as the configurable accounting management parameter discussed above. The operational flow diagram of FIG. 13 begins at step 1302 and flows directly to step 1304. The billing server 124, at step 1304, monitors activity associated with at least a first wireless service node such as access point 112 and a second wireless service node such as access point 114. The billing server 124, at step 1306, determines a service usage load associated with each of the first wireless service node and the second wireless service node. The billing server 124, at step 1308, generates at least one service usage management configuration parameter for each of the first wireless service node and the second wireless service node. In various embodiments, the service usage management configuration parameter includes information for one or more of managing wireless device service usage and managing wireless service node migration based on the service usage load associated with the first wireless service node and the second wireless service node, respectively, or may include information based on any other type of service usage or migration management information. The control flow then exits at step 1310.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with a first wireless access node, for managing wireless service usage and access node migration, the method comprising:
receiving a registration request from a wireless device;
establishing a charging session with a billing server, wherein the charging session is associated with the wireless device;
monitoring wireless service usage associated with the wireless device;
determining that the wireless device is migrating to a new wireless access node;
transferring billing information associated with the charging session and timer data indicating an amount of time that has elapsed since a most recent accounting record was sent to the billing server to the new wireless access node; and
transferring, to the new wireless access node, wireless service usage information and a hop count, wherein the hop count indicates a number of nodes that the wireless device has traversed since a most recent accounting record was sent to the billing server.

2. The method of claim 1, further comprising:
monitoring, by the new wireless access node, wireless service usage by the wireless device under the charging session that has been established.

3. The method of claim 1, wherein the establishing a charging session further comprises:
receiving accounting report interval information and a configurable accounting parameter from the billing server, wherein the accounting report interval information indicates how often an accounting report is to be sent to the billing server, and wherein the accounting parameter indicates how to manage wireless service usage and wireless access node migration.

4. The method of claim 1 further comprising:
transmitting, in response to the determining that wireless device is migrating to new access node, an accounting record to the billing server, wherein the accounting record comprises wireless service usage information associated with the wireless device.

5. The method of claim 1, wherein transferring information further comprises:
transmitting to the billing server, by the new wireless service node, the billing information concerning wireless service usage by the wireless device at the first wireless access node.

6. The method of claim 5, wherein transmitting the wireless service usage information to the billing server further comprises:
initiating, by the new wireless access node, an accounting timer;
determining, by the new wireless access node, that the accounting timer has expired; and
transmitting to the billing server, by the new wireless access node in response to determining that the accounting timer has expired, an accounting record comprising at least one of the wireless service usage information and wireless service usage information monitored during the accounting timer.

7. A method, with a wireless service node, for managing wireless service usage and service node migration, the method comprising:
receiving a registration request from a wireless device;
establishing a charging session with a billing server, wherein the charging session is associated with the wireless device;
monitoring wireless service usage associated with the wireless device;
determining that the wireless device is migrating to a new wireless service node;
transferring wireless service usage information to the new wireless service node and timer data indicating an amount of time that has elapsed since a most recent accounting record was sent to the billing server;

initiating, by the new wireless service node, an accounting timer based on a reporting interval received from the billing server and the elapsed time indicated by the timer data;

determining, by the new wireless service node, that the accounting timer has expired; and transmitting to the billing server, by the new wireless service node in response to determining that the accounting time has expired, an accounting record, wherein the accounting record comprising the wireless service usage information received from the wireless service node and wireless service usage information recorded by the new wireless service node during the time interval from the initiating of the accounting timer until it has expired.

8. The method of claim 1, wherein transferring further comprises:

determining, by the new wireless access node, that the hop count has exceeded a given threshold; and transmitting to the billing server, by the new wireless access node, an accounting record comprising the wireless service usage information received from the wireless access node and wireless service usage information recorded by the new wireless access node.

9. An apparatus for managing wireless service usage and service node migration, the apparatus comprising:

a wireless access node having:
  a memory;
  a processor communicatively coupled to the memory;
  a transceiver communicatively coupled to the memory and the processor; and
  a device manager communicatively coupled to the memory, processor, and transceiver, wherein the device manager is adapted to:
    receive a registration request from a wireless device;
    establish, with a billing server, a charging session associated with the wireless device;
    monitor wireless service usage associated with the wireless device;
    determine that the wireless device is migrating to another wireless access node;
    transfer billing information associated with the charging session that has been established and timer data indicating an amount of time that has elapsed since a most recent accounting record was sent to the billing server to the another wireless access node; and
    transfer unreported wireless service usage information to the another wireless access node and timer data indicating an amount of time that has elapsed since a most recent accounting record was sent to the billing server; and the another wireless access node configured to
  initiate an accounting timer equal to a reporting interval received from the billing server less the time indicated by the timer data;
  determine that the accounting timer has expired; and
  transmit to the billing server, in response to determining that the accounting time has expired, an accounting record comprising at least one of the wireless service usage information and wireless service usage information monitored during the accounting timer by the new wireless access node.

10. The apparatus of claim 9, wherein the apparatus further comprises the another wireless access node and wherein the another wireless access node is configured to continue to monitor wireless service usage by the wireless device under the charging session that has been established.

11. The apparatus of claim 9, wherein the device manager is further adapted to:

receive wireless service usage management configuration parameters from the billing server, wherein the wireless service usage management configuration parameters specify at least one of wireless service usage reporting intervals and wireless service usage transfer modes, wherein the wireless service usage transfer modes specify that the wireless access node is to transfer wireless service usage information to one of the another wireless access node and the billing server when the wireless access node determines that the wireless device is migrating to the another wireless access node.

12. The apparatus of claim 9, wherein the apparatus further comprises the another wireless access node, wherein the transfer of information further comprises transferring wireless service usage information to the another wireless access node, and wherein the another wireless access node is configured to:

initiate an accounting timer;
determine that the accounting timer has expired; and
transmit to the billing server, in response to determining that the accounting timer has expired, an accounting record comprising at least one of the wireless service usage information and wireless service usage information monitored by the another wireless access node during the accounting timer.

* * * * *